United States Patent
Nishide (10) Patent No.: US 8,145,260 B2
(45) Date of Patent: Mar. 27, 2012

(54) TERMINAL DEVICE AND METHOD RELATED THERETO

(75) Inventor: Atsushi Nishide, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 134 days.

(21) Appl. No.: 12/778,373

(22) Filed: May 12, 2010

(65) Prior Publication Data
US 2010/0291964 A1 Nov. 18, 2010

(30) Foreign Application Priority Data
May 18, 2009 (JP) .................. 2009-119666

(51) Int. Cl.
*H04M 1/00* (2006.01)
*H04B 17/00* (2006.01)

(52) U.S. Cl. .................. 455/550.1; 455/67.13

(58) Field of Classification Search ............... 455/452.2, 455/453, 556.1, 556.2
See application file for complete search history.

(56) References Cited

U.S. PATENT DOCUMENTS
2006/0252376 A1* 11/2006 Fok et al. .............. 455/67.13
2007/0135995 A1 6/2007 Kikuchi et al.

FOREIGN PATENT DOCUMENTS
JP 2002-261919 9/2002
JP 2005-121531 5/2005
JP 2006-252218 9/2006

* cited by examiner

*Primary Examiner* — Nick Corsaro
*Assistant Examiner* — Joel Ajayi
(74) *Attorney, Agent, or Firm* — Staas & Halsey LLP (57) ABSTRACT

A terminal device includes a call control unit configured to process a phone call with a recipient, an application control unit configured to control execution of an application program, a determination unit configured, when the application control unit issues an instruction to start the application program during a call processing by the call control unit, to determine whether the speech communication quality will be degraded, and a transmitting unit configured, when determined that the speech communication quality will be degraded, to transmit an alert message for warning of the degradation of speech communication quality to the recipient.

10 Claims, 10 Drawing Sheets

| EXTENDED MESSAGE FORMAT |
|---|
| MESSAGE TYPE: SIPURI  RESOURCE TYPE  STATE TYPE  DATE  TIME |
| - MESSAGE TYPE (Alert-ON/Alert-OFF/Dialog-OPEN/Dialog-OK/Dialog-CLOSE)<br>- SIPURI (username)<br>- RESOURCE TYPE(CPU/MEMORY/STORAGE/OTHER)<br>- STATE TYPE(BUSY/STABLE/FULL/FREE)<br>- DATE(YYYYMMDD)<br>- TIME(hh:mm:ss) |

TERMINAL DEVICE AND METHOD RELATED THERETO

CROSS-REFERENCE TO RELATED APPLICATIONS

This application is based upon and claims the benefit of priority from the prior Japanese Patent Application No. 2009-119666 filed on May 18, 2009, the entire contents of which are incorporated herein by reference.

FIELD

Various embodiments described herein relate to a terminal device and method of operating same.

BACKGROUND

Some recent mobile phones can store information for use in conversation. Examples of the information for use in conversation are date and time, such as a schedule, and numerical information, such as the price and number of goods. The information for use in conversation mentioned above is mainly used for business conversation. The information for use in conversation is generally input to a mobile phone with an input device of the mobile phone or through the reception of email including such information and is stored in a recording medium in the mobile phone. The stored information can be called up onto the display of the mobile phone through the execution of an application program for viewing the information.

Mobile phones generally incorporate a dedicated operating system (hereinafter referred to as an OS) and one or more application programs (hereinafter referred to as applications) in advance. The one or more applications include an application for calling up the information for use in conversation mentioned above.

The OS processes a voice call while a mobile phone is in service. In service, the OS limits the execution of applications or processing operations thereof. This can reduce the influence of the operating load of the applications on the voice call processing of the OS, thus maintaining the quality of a voice call.

Examples of typical technologies related to the above description include Japanese Laid-open patent publication No. 2005-121531, Japanese Laid-open patent publication No. 2006-252218, and Japanese Laid-open patent publication No. 2002-261919.

Some recent mobile terminals perform call processing with a versatile OS; for example, mobile terminals called smart-phones in which a mobile phone and a PHS (personal handy phone) or a wireless IP phone and a PDA (personal digital assistants) are combined. Mobile terminals that process voice calls with a versatile OS have specifications in which users can freely add applications. In the mobile terminals that process voice calls with a versatile OS, the versatile OS does not limit the operation of an application during a voice call. Accordingly, the user can operate an application by operating the mobile terminal even during a voice call. This allows the user to view information for use in conversation and to use it for conversation by the operation of the application.

However, the operation of an application during a voice call consumes resource(s) of the mobile terminal, which may hinder smooth voice call processing of the versatile OS. The hindering of smooth voice call processing may degrade the speech communication quality and/or disconnect the voice call.

SUMMARY

A terminal device includes a call control unit configured to process a phone call with a recipient, an application control unit configured to control execution of an application program, a determination unit configured, when the application control unit issues an instruction to start the application program during a call processing by the call control unit, to determine whether a speech communication quality will be degraded and a transmitting unit configured, when determining that the speech communication quality will be degraded, to transmit an alert message for warning of the degradation of speech communication quality to the recipient.

The object and advantages of the various embodiments will be realized and attained by means of the elements and combinations particularly pointed out in the claims. It is to be understood that both the foregoing general description and the following detailed description are exemplary and explanatory and are not restrictive of the invention, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings, wherein like reference numerals refer to the like elements throughout. The embodiments are described below to explain the present invention by referring to the figures. Embodiments of the present invention are described below with reference to the drawings. The configurations of the embodiments are merely examples. The present invention is not limited to the configurations of the embodiments.

Figure 1:
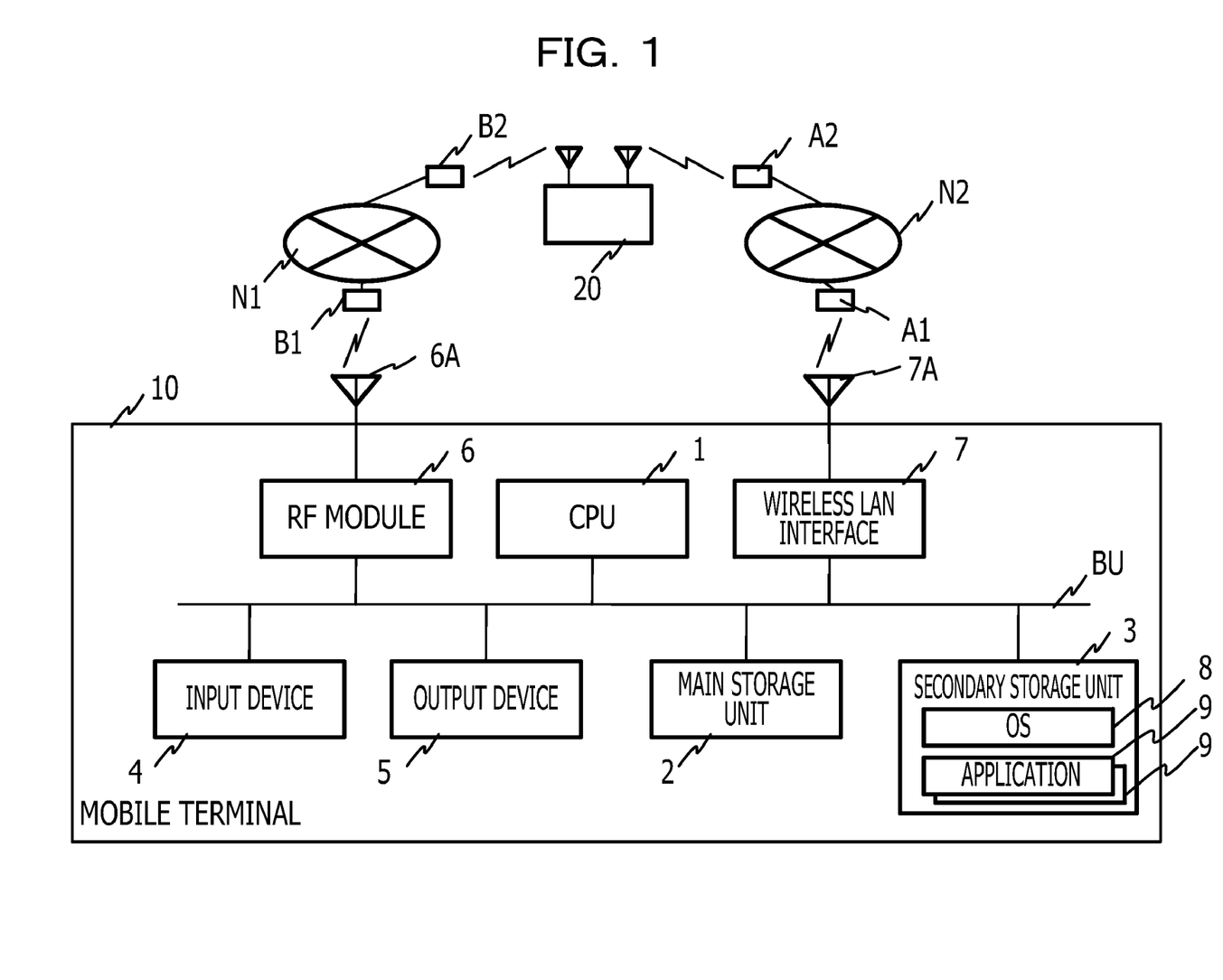
FIG. 1 is a diagram illustrating an example of a mobile communication system incorporating a terminal device according to an embodiment.

FIG. 1 is a diagram illustrating an example of a mobile communication system incorporating a terminal device according to an embodiment. In FIG. 1, the mobile communication system includes, as network facilities, a mobile phone network N1, base stations B1 and B2 connected to the mobile phone network N1, an IP (Internet protocol) network N2, and access points A1 and A2 connected to the IP network N2.

FIG. 1 illustrates mobile wireless terminal devices (hereinafter referred to as mobile terminals) 10 and 20 as examples of the terminal device. The mobile terminal 10 is capable of voice communications, that is, telecommunications, with the mobile terminal 20 as a recipient via the base station B1, the mobile phone network N1, and the base station B2. The mobile terminal 10 is also capable of IP communications with the mobile terminal 20 via the access point A1, the IP network N2, and the access point A2. Examples of the IP network N2 include the Internet and an intranet. While particular types of networks are described herein as an example, the present invention is not limited to any particular number or type of network.

The mobile terminals 10 and 20 may have the same configuration. The mobile terminal 10 will be described by way of example. The mobile terminal 10 has both a function as a mobile phone or a PHS terminal and a function as a PDA having a wireless LAN terminal function. Such terminal devices are called smartphones.

The mobile terminal 10 includes a CPU (central processing unit) 1, a main storage unit 2, a secondary storage unit 3, an input device 4, an output device 5, an RF (radio frequency) module 6, and a wireless LAN (local area network) interface 7.

The CPU 1, the main storage unit 2, the secondary storage unit 3, the input device 4, the output device 5, the RF module 6, and the wireless LAN interface 7 are connected one another via a bus BU and input and output devices and an interface circuit, which are not shown.

The main storage unit 2 may include a ROM (read-only memory) that stores data and programs and a RAM (random access memory called a memory) for use as a work area for the CPU 1.

Examples of the secondary storage unit 3 are an EPROM (erasable programmable ROM) and a HDD (hard disc drive), in which an OS 8 and a plurality of programs, such as applications 9, are installed. The secondary storage unit 3 also stores data used when the OS 8 or the programs, such as the applications 9, are executed. One of the applications 9 is a VoIP (Voice over IP) application responsible for IP phone functionality.

The OS 8 manages the applications 9 and controls the operation(s) of the applications 9. The OS 8 also performs voice communication processing including a call handling when the mobile terminal 10 performs, as a mobile phone, a voice communication with a recipient (for example, the mobile terminal 20).

Meanwhile, the plurality of applications 9 is, for example, a mailer that takes charge of transmission/reception and management of email and scheduling software for managing the schedule of the user. Email transmitted and received through the mailer and schedule data created using the scheduler are stored in a predetermined storage area of the secondary storage unit 3.

Information included in email and schedule data can be called up onto the screen of a display of the output device 5. The user can use the displayed information as information for conversation, i.e., voice communication.

The RF module 6 can transmit and receive voice calls during a voice communication using a mobile phone function through wireless communication with a base station (the base station B1 in FIG. 1) in a communication area in which the mobile terminal 10 is present via an antenna 6A.

The wireless LAN interface 7 can transmit and receive data (packet) of IP communication during IP communication using a wireless LAN terminal function through wireless communication with an access point (the access point A1 in FIG. 1) during IP communication using a wireless LAN terminal function via an antenna 7A.

The input device 4 includes a plurality of keys or buttons for the user to input data and a microphone for the user to input voice. The output device 5 includes a display for displaying data or information stored in the main storage unit 2 and the secondary storage unit 3 and a speaker for outputting voice based on audio data input to or received by the mobile terminal 10.

The CPU 1 loads programs stored in the ROM of the main storage unit 2, and the OS 8 and programs, such as the applications 9, stored in the secondary storage unit 3 into the RAM (memory) of the main storage unit 2 and executes them. The CPU 1 implements the function of a mobile phone and the function of a PDA, as described above, through execution of the programs. In other words, the mobile terminal 10 functions as a mobile phone, a PHS terminal, or an IP phone terminal to allow communication with a recipient.

The OS 8 is a versatile OS. The OS 8 takes charge of a voice call processing for implementing a mobile phone function. In other words, function as a call control section that handles voice calls is implemented by the CPU 1 executing the OS 8.

The mobile terminal 10 can, for example, download a desired application 9 via the IP network N2 and can install the application 9 in the secondary storage unit 3. The OS 8 does not restrict the starting and operation of the applications 9 during voice call processing (in service). This allows the user to start one application 9 during conversation, to call up desired information onto a display, and to continue the conversation with reference to the information.

However, the OS 8 shares system resources (hereinafter simply referred to as resources), such as the CPU 1, the memories of the main storage unit 2, and the networks, with the plurality of applications 9. Therefore, assuming that 80% of the resources is consumed during the voice call processing of the OS 8, if the above application 9 consumes the remaining 20% of the resources during the voice call processing, smooth voice call processing could be hindered, which could affect, i.e., degrade the speech communication quality, thus causing, for example, jumpiness. Significant degradation of speech communication quality could make it difficult to continue conversation or disconnect the call.

With the above application 9 in a steady state, even if the resources are consumed within the remaining 20%, 20% or more of the resources could be consumed at the starting of the above application 9. This could affect the speech communication quality during the period from the starting of the above application 9 to the steady state.

In view of the above and other existing problems of typical systems, when one of the plurality of applications 9 is started during a conversation, i.e., during a voice call processing by the OS 8, the mobile terminal 10 of an embodiment transmits an alert message that warns of the degradation of speech communication quality to a recipient in consideration of resource consumption of the mobile terminal 10. When one of the plurality of applications 9 is started and seems to shift to a steady state, the mobile terminal 10 transmits a recovery message indicating that the speech communication quality has recovered to the recipient. Such functions are implemented by the CPU 1 executing a communication control program installed as one of the applications 9.

Figure 2:
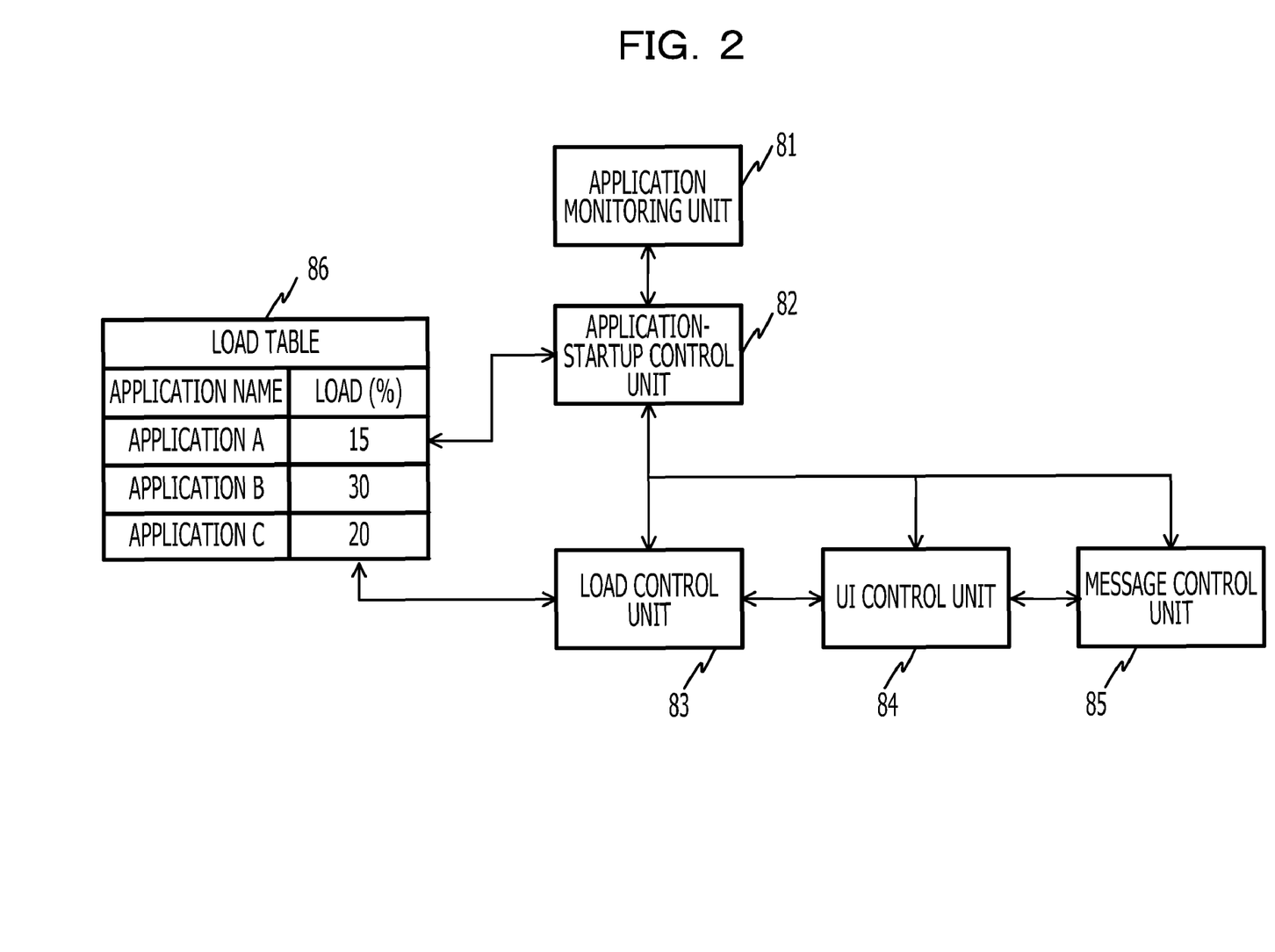
FIG. 2 is a schematic block diagram illustrating function(s) implemented by a CPU executing a communication control program.

FIG. 2 is a schematic block diagram illustrating function(s) implemented by the CPU 1 executing a communication control program which is one of the applications 9. As shown in FIG. 2, an application monitoring section 81, an application-startup control section 82, a load control section 83, an UI (user interface) control section 84, and a message control section 85 are implemented by the CPU 1 executing the communication control program. Furthermore, a load table 86 is provided. The load table 86 may be provided in a memory of the main storage unit 2 or in a storage area of the secondary storage unit 3.

The load table 86 stores resource usages (load values) of individual applications 9 installed in the mobile terminal 10, which are required at the starting (startup) of the applications 9. The load values can be determined from, for example, CPU 1 usage, memory usage, or a combination of the CPU 1 usage and the memory usage. The load values of the applications 9 can be obtained in advance by an experiment or the like and can be statistically stored in the load table 86. Alternatively, the load table 86 may be dynamically created. A method for creating the dynamic load table 86 is described in detail below including with respect to FIG. 8. While specific examples of elements are discussed for determining load values, the present invention is not limited to any particular load value. For example, a load of a device may be determined by utilizing information of any of various factors that affect a load of the device.

The application monitoring section 81 monitors state(s) and operation(s) of the individual applications 9. The application-startup control section 82 controls the starting operations of the applications 9. The load control section 83 monitors loads on (resource usage of) the mobile terminal 10, such as CPU 1 usage, memory usage, etc. The load control section 83 performs reading/writing of information from/to the load table 86 and determination of a load, described in detail below. The UI control section 84 controls display of information on the display of the output device 4 and output of voice information to the speaker of the output device 4. The message control section 85 creates and transmits the alert message and the recovery message described above. To indicate the alert message and the recovery message collectively, the expression "conversation control message" is used.

The CPU 1 that executes the OS 8 and the applications 9 corresponds to a call control section, an application control section, and a determination section of the terminal device according to an embodiment of the present invention. The application control section is implemented by the CPU 1 serving as the application-startup control section 82. The determination section is implemented by the CPU 1 serving as the load control section 83.

The wireless LAN interface 7 corresponds to a transmitting section and a receiving section of the terminal device according to an embodiment of the present invention. The wireless LAN interface 7 serving as a transmitting section and a receiving section is controlled by the CPU 1 serving as the message control section 85.

The output device 5 corresponds to an inquiry section and a notifying section of the terminal device according to an embodiment of the present invention. The output device 5 is controlled by the CPU 1 serving as the UI control section 84. The input device 4 is used for the user to input a reply.

An operation example of the mobile terminal 10 is described in detail hereinbelow. Referring to FIG. 1, assume that a user of the mobile terminal 10 (referred to as a user A) is in the process of conducting a conversation with a user of the mobile terminal 20 (referred to as a user B) using a mobile phone function. In this case, a call is established between the mobile terminal 10 and the mobile terminal 20 via the mobile base station B1, the mobile phone network N1, and the base station B2 to enable a voice call between the mobile terminal 10 and the mobile terminal 20, that is, a conversation between the user A and the user B.

Various voice call process(es), such as a process for establishing a call, a process for encoding and modulating the voice of the user A input via a microphone and transmitting it to the base station B1 via the antenna 6A, and a process for demodulating and decoding a radio signal received via the antenna 6A and outputting the voice of the user B via a speaker, are implemented using the function of the call control sections of the mobile terminals 10 and 20, which is implemented by the CPUs 1 executing the respective OSs 8. During a voice call, the mobile terminals 10 and 20 can transmit about 300 bytes of voice data every 20 millisecond.

Assume that the user A manipulates the input device 2 (keys or buttons) of the mobile terminal 10 to input an instruction to start one of the plurality of applications 9 (application A) during such a voice call.

Figure 3:
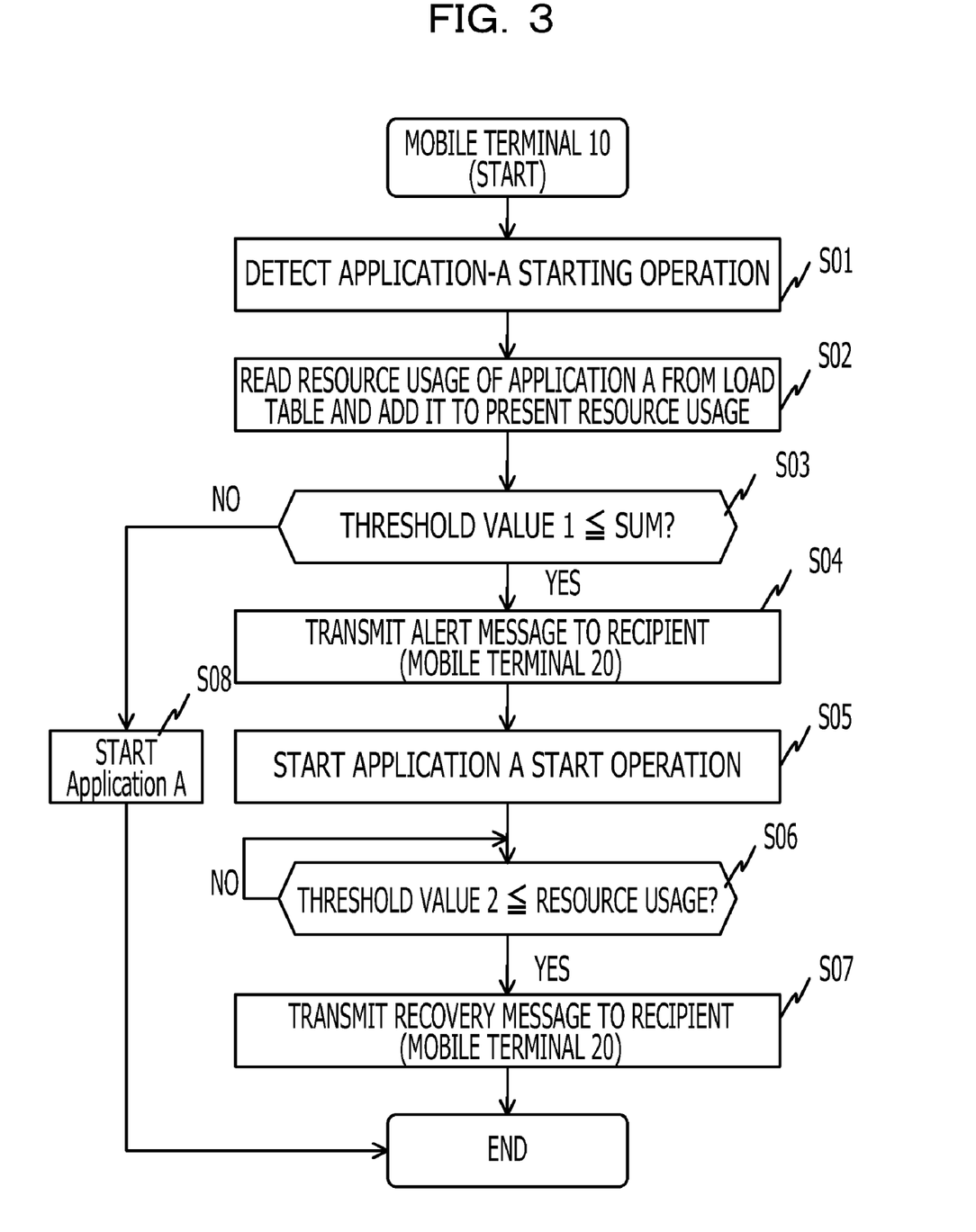
FIG. 3 is a flowchart illustrating an example of a process of a mobile terminal in service (a process through an execution of a communication control program) at a starting of an application.

FIG. 3 is a flowchart illustrating an example of a process of the mobile terminal 10 in service (a process through the execution of the communication control program) at a starting of an application. In the flowchart of FIG. 3, when the application monitoring section 81 (FIG. 2) detects an application-A starting operation, i.e., an input of an instruction to start the application A (FIG. 3: operation S01), the application monitoring section 81 gives an instruction to start the application A to the application-startup control section 82.

The application-startup control section 82 that has received the start instruction notifies the load control section 83 of the starting of the application A. The load control section 83 that has notified of the starting of the application A reads the resource usage of the application A from the load table 86 and adds the resource usage to the present resource usage (FIG. 3: operation S02).

The load control section 83 holds a threshold value (referred to as a threshold value 1) of each resource usage at which speech communication quality is degraded due to shortage in resource. The load control section 83 compares a sum with the threshold value 1 (FIG. 3: operation S03). If the sum is smaller than the threshold value 1 (S03: NO), the load control section 83 permits the application-startup control section 82 to start the application A, so that the application-startup control section 82 starts the process of starting the application A (FIG. 3: operation S08). Thereafter, the process through the execution of the communication control program is completed.

In contrast, if the sum is greater than or equal to the threshold value 1 (S03: YES), the process of transmitting an alert message is performed (FIG. 3: operation S04). In other words, the load control section 83 writes the present resource usage, i.e., a resource usage before the starting of the application A, to the load table 86. The load control section 83 instructs the message control section 85 to transmit an alert message. The message control section 85 generates an alert message. The mobile terminal 10 according to an embodiment uses SIP (session initiation protocol) as a method for transmitting an alert message. In other words, the mobile terminal 10 creates an SIP message including an alert message and transmits the message to the mobile terminal 20.

Figure 4A:
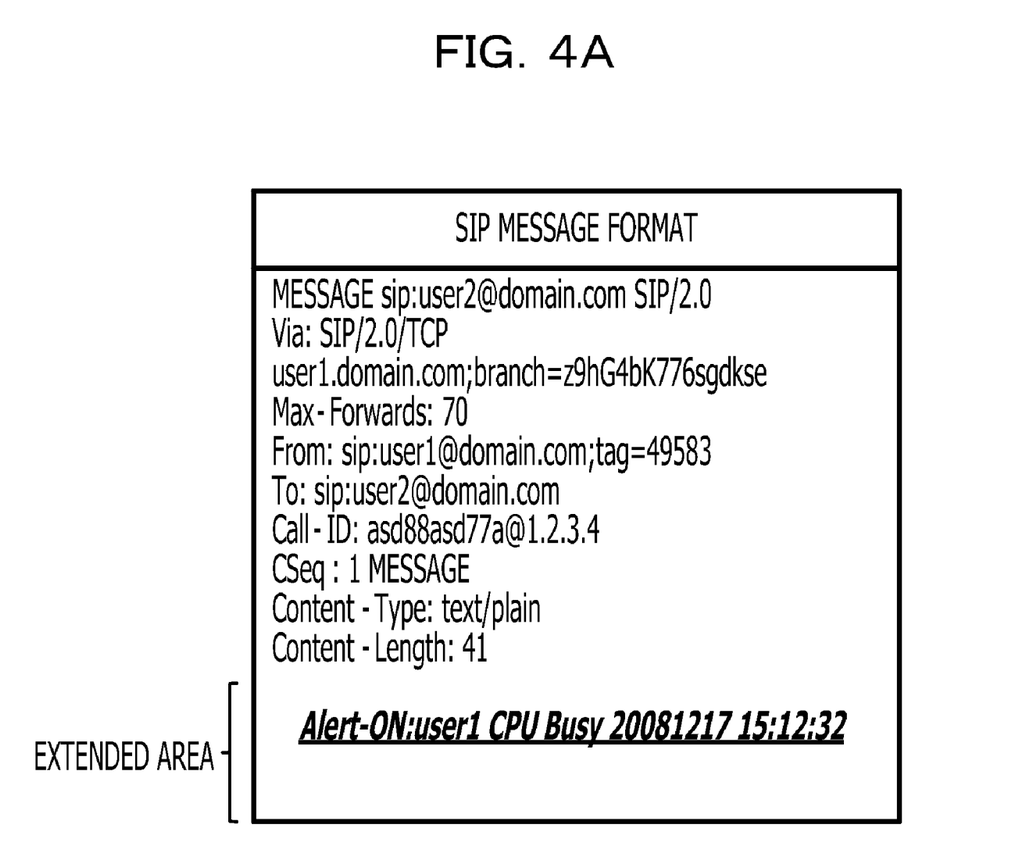
FIG. 4A shows an example of a format of an SIP message.
Figure 4B:
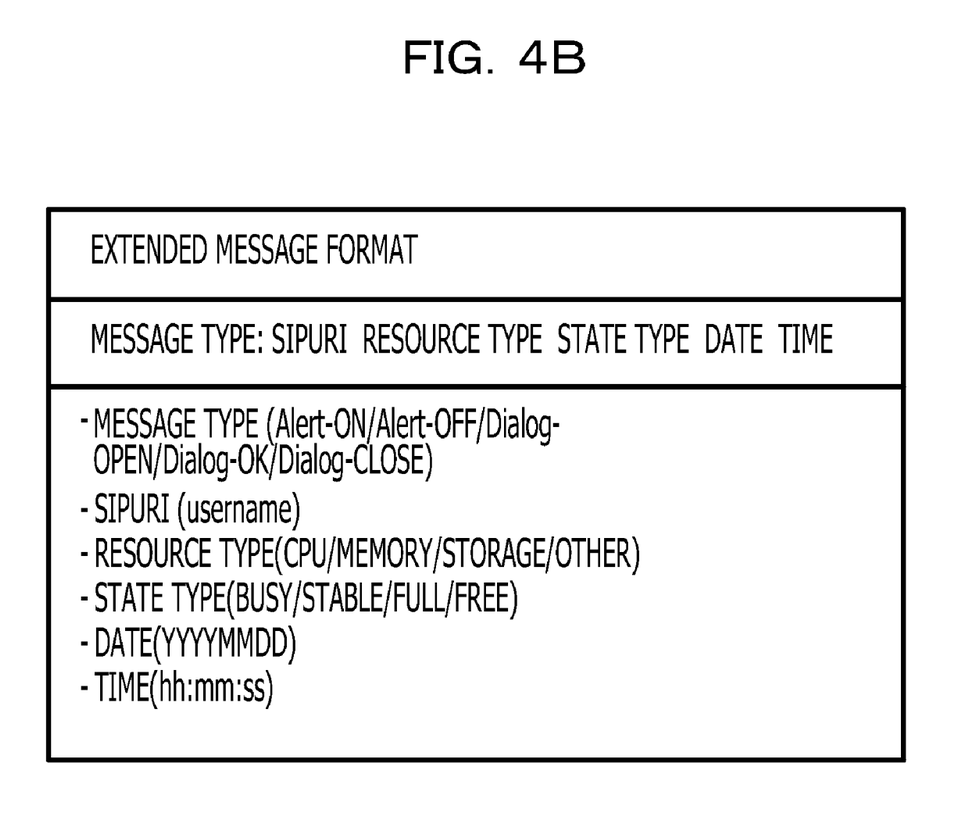
FIG. 4B shows an example of a format of a conversation control message.

FIG. 4A shows an example of a format of the SIP message. FIG. 4B shows an example of a format of a conversation control message. As shown in FIG. 4A, the SIP message is character data of about several tens of bytes. The SIP message format has an extended area in which description is not limited. The conversation control message is described in the extended area.

In the example shown in FIG. 4B, the conversation control message has a specified format including "message type: SIPURI, resource type, state type, date, and time". The "message type" has five types, "Alert-ON", "Alert-OFF", "Dialog-OPEN", "Dialog-OK", and "Dialog-CLOSE".

The message type "Alert-ON" indicates that the message is an alert message that warns of "degradation of speech communication quality". The message type "Alert-OFF" indicates that the message is a message indicating "lifting the alert of degradation of speech communication quality or recovery from the degradation of speech communication quality". The message type "Dialog-OPEN" indicates that the message is a "dialog box (window) display instruction" message. The message type "Dialog-OK" indicates that the message is a message permitting a content displayed in the dialog box. The message type "Dialog-CLOSE" indicates that the message is a message denying a content displayed in the dialog box.

"SIPURI" is a URI (uniform resource identifier) that is an address (user identifier) in the SIP. Here, only a user name of the normal URI is shown. In other words, the portion following at sign (@) is omitted. Assuming that the URI of the mobile terminal 10 (user A) is "user1@domain.com", "user1" is represented as SIPURI notation on the extended area.

The resource type includes "CPU", "MEMORY (main storage unit)", "STORAGE (secondary storage unit)", and "OTHER". The state type includes "BUSY" and "STABLE" indicating the state of the CPU and "FULL" and "FREE" indicating the state of the memory or the storage. The date and the time are used as a time stamp.

For example, "Alert-ON:user1 CPU Busy 20081217 15:12:32" shown in the extended area in FIG. 4A indicates that the SIP message is an alert message indicating the degradation of speech communication quality due to the busy state of the CPU 1 of the user 1 (mobile terminal 10) issued at 15:12:32 on Dec. 17, 2008.

In an embodiment, "Alert-ON" and "Alert-OFF" are used as the message type. The resource type and the state type are optional. In this operation example, the usage of the CPU 1 (load on the CPU 1) is applied as an example of the resource usage.

In operation S04 in FIG. 3, the SIP message including the conversation message "Alert-ON: user1 CPU Busy 20081217 15:12:32", shown in FIG. 4A, i.e., an alert message, is transmitted. In other words, the message control section 85 controls the wireless LAN interface 7 to transmit the SIP message to the access point A1 (FIG. 1) via the antenna 7A by radio. The SIP message received by the access point A1 is sent to the mobile terminal 20 via the IP network N2 and the access point A2.

Figure 5A:
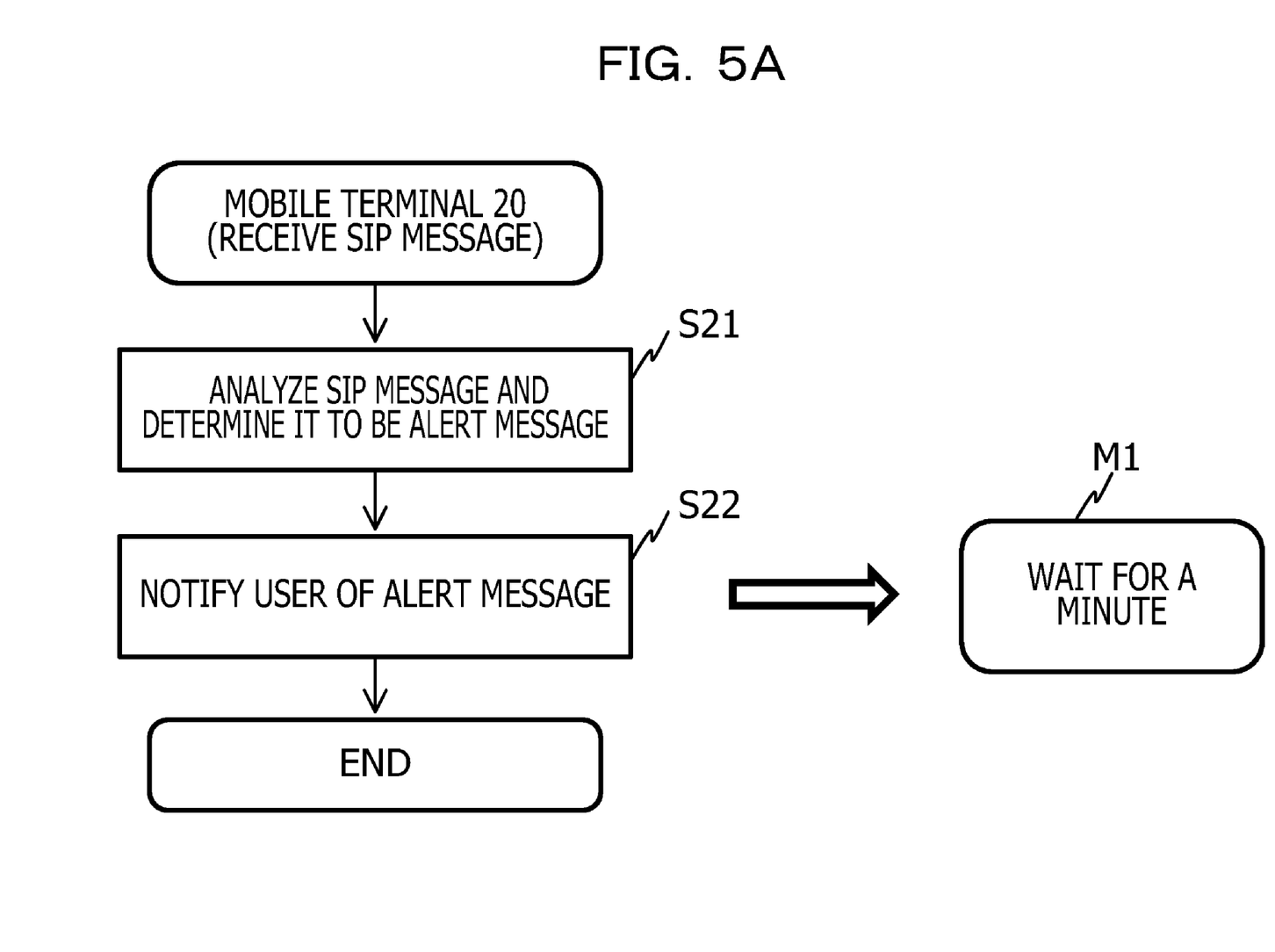
FIG. 5A is a flowchart illustrating a process of a receiving-end mobile terminal after receiving an alert message.

FIG. 5A is a flowchart illustrating the process of the receiving-end mobile terminal 20 after receiving the alert message. The SIP message received via the antenna 7A of the mobile terminal 20 is given to the CPU 1 (message control section 85) via the wireless LAN interface 7.

The message control section 85 analyzes the received SIP message and determines that the SIP message is an alert message having the message type "Alert-ON" (operation S21 in FIG. 5A). Then, the message control section 85 instructs the UI control section 84 to notify the user B of "Alert-ON", that is, the alert message, so that the UI control section 84 notifies the user B of the alert message (operation S22 in FIG. 5A). In an embodiment, the message control section 85 gives an instruction to display a content corresponding to the alert message on the display of the output device 5.

The storage area of the secondary storage unit 3 holds display screen data (display content data) corresponding to the message type of a conversation control message. The UI control section 84 controls the display of the output device 5 to display a display screen based on display content data corresponding to the message type "Alert-ON", i.e., the alert message.

The display content is, for example, a character message "Wait for a minute" that warns the user B to keep from conversation as the speech communication quality degrades (see a screen M1 in FIG. 5A). Alternatively, the display content may include a character message that warns that the speech communication quality will be degraded for a while. In addition to the display of a character message, the UI control section 84 can output an audible alert (alarm) or an audible guidance from the speaker by controlling the output device 5. Audio data for the alarm or the audible guidance can be prepared in the storage area of the secondary storage unit 3.

This allows the user B of the mobile terminal 20 to know from the character message displayed on the display or the alarm and/or audible guidance that the speech communication quality will be degraded and to keep from conversation for a while.

On the other hand, in the mobile terminal 10, the application-startup control section 82 is notified of the transmission of the SIP message (alert message) by the message control section 85 after the process of operation S04 in FIG. 3. Then, the application-startup control section 82 starts the process of starting the application A (operation S05 in FIG. 3).

With the process of starting the application A, the resource of the mobile terminal 10 is consumed, so that the resource usage of the mobile terminal 10 temporarily increases until the starting process ends, so that the mobile terminal 10 comes to a high load state. The load control section 83 continuously monitors the resource usage, i.e., the load, including from before the application A is started and waits for the resource usage to become a resource usage in a normal state after completion of the application A starting process.

For example, assume that, in the steady state after completion of the application A starting process, the resource usage increases about 5% from before the starting process. In this case, the load control section 83 waits for the resource usage to increase about 5% from before the starting of the application, i.e., the steady state.

The load control section 83 holds the resource usage (in the above example, 5%) with the application A in the steady state in advance. This resource usage is added to the resource usage before the starting of the application A stored in the load table 86 to generate a threshold value (threshold value 2) for determining whether the application A is in the steady state.

For example, assuming that the resource usage before the starting of the application A is 60% and the resource usage with the application A in the steady state is 5%, the threshold value 2 is set to 65% or a value a few percent higher than 65%.

The load control section 83 determines whether the resource usage is smaller than or equal to the threshold value 2 (operation S06 in FIG. 3), and if the present resource usage becomes smaller than or equal to the threshold value 2 (S06: YES), the load control section 83 determines that the application A starting process has been completed into the steady state. The resource usage with the application A in the steady state can also be registered in advance in the load table 86.

When the resource usage has become smaller than or equal to the threshold value 2, the process of transmitting a recovery message is performed (operation S07 in FIG. 3). In other words, when the resource usage has become smaller than or equal to the threshold value 2, the load control section 83 instructs the message control section 85 to transmit a recovery message (one of conversation control messages) indicating a recovery from degradation of speech communication quality.

The message control section 85 creates a recovery message. Specifically, the message control section creates a recovery message, for example, a SIP message in which a conversation control message, such as "Alert-OFF: user1 CPU STABLE 20081217 15:15:30", is stored in the extended area and transmits the recovery message to the mobile terminal 20.

The SIP message including the recovery message passes the same path as of the SIP message including the alert message to reach the mobile terminal 20. In the mobile terminal 20, the SIP message including the recovery message received by the antenna 7A is given to the CPU 1 (message control section 85) via the wireless LAN interface 7.

Figure 5B:
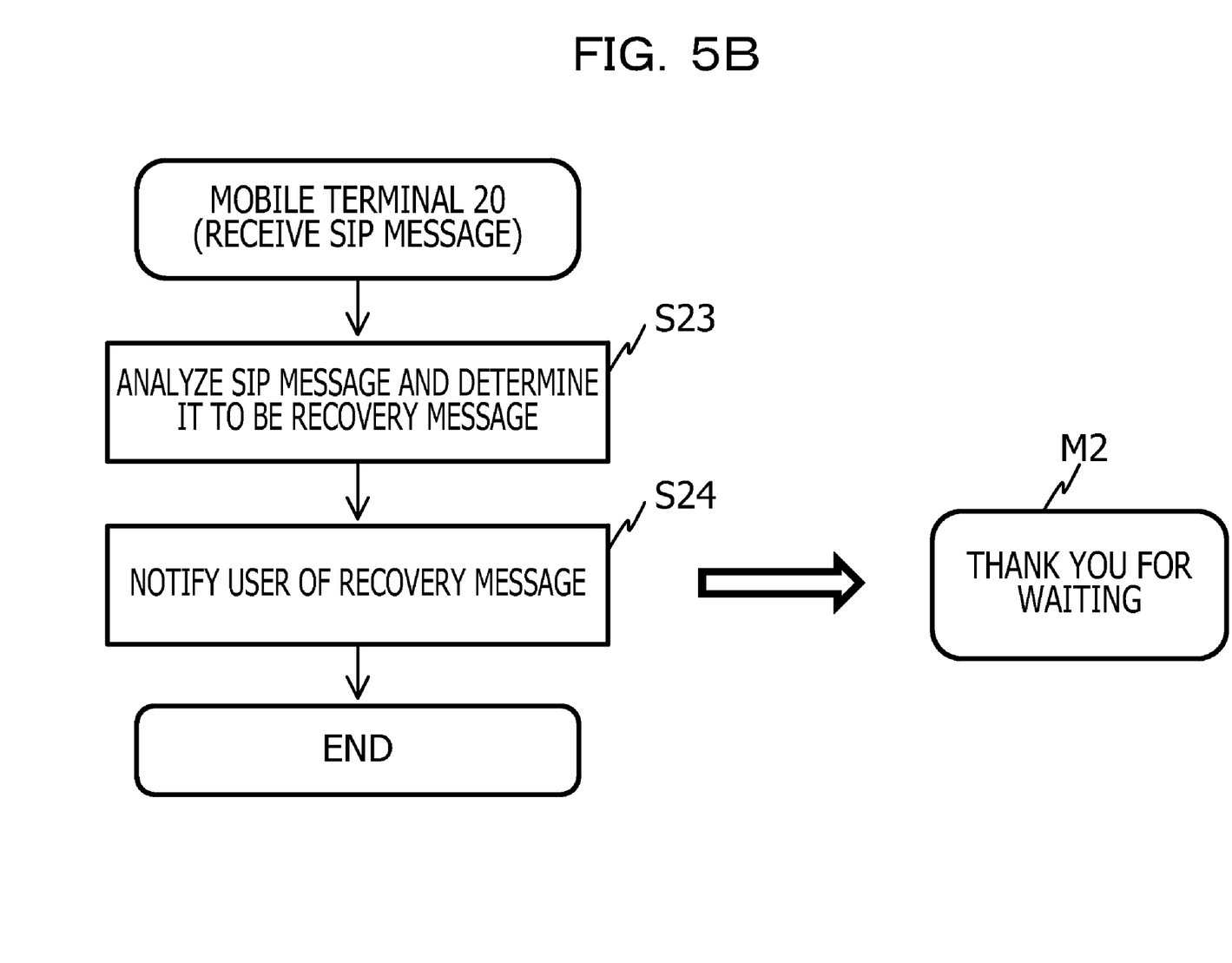
FIG. 5B is a flowchart illustrating an example of a process of a receiving-end mobile terminal after receiving a recovery message.

FIG. 5B is a flowchart illustrating an example of the process of the receiving-end mobile terminal 20 after receiving the recovery message. In FIG. 5B, the message control section 85 analyzes the received SIP message and determines that the SIP message is a recovery message having the message type "Alert-OFF" (operation S23 in FIG. 5B).

Then, the process of notifying the user B of the recovery message is performed (operation S24 in FIG. 5B). Specifically, the message control section 85 instructs the UI control section 84 to notify the user B of "Alert-OFF", that is, the recovery message. In an embodiment, the message control section 85 gives an instruction to display a content corresponding to the recovery message on the display of the output device 5.

Then, the UI control section 84 reads display screen data corresponding to the recovery message from the storage area of the secondary storage unit 3 and controls the display of the output device 5 to display a display screen based on the display screen data.

The display content is, for example, a character message "Thank you for waiting" that prompts the user B to restart the conversation owing to the recovery from the degradation of speech communication quality (see a screen M2 in FIG. 5B). Alternatively, the display content may include a character message indicating that the speech communication quality has recovered from degradation. In addition to the display of a character message, the UI control section 84 can output an audible alert (alarm) or an audible guidance from the speaker by controlling the output device 5. Audio data for the alarm or the audible guidance can be prepared in the storage area of the secondary storage unit 3.

This allows the user B of the mobile terminal 20 to know from the character message displayed on the display or the alarm and/or audible guidance that the conversation can be restarted due to the recovery from the degradation of speech communication quality.

Figure 6:
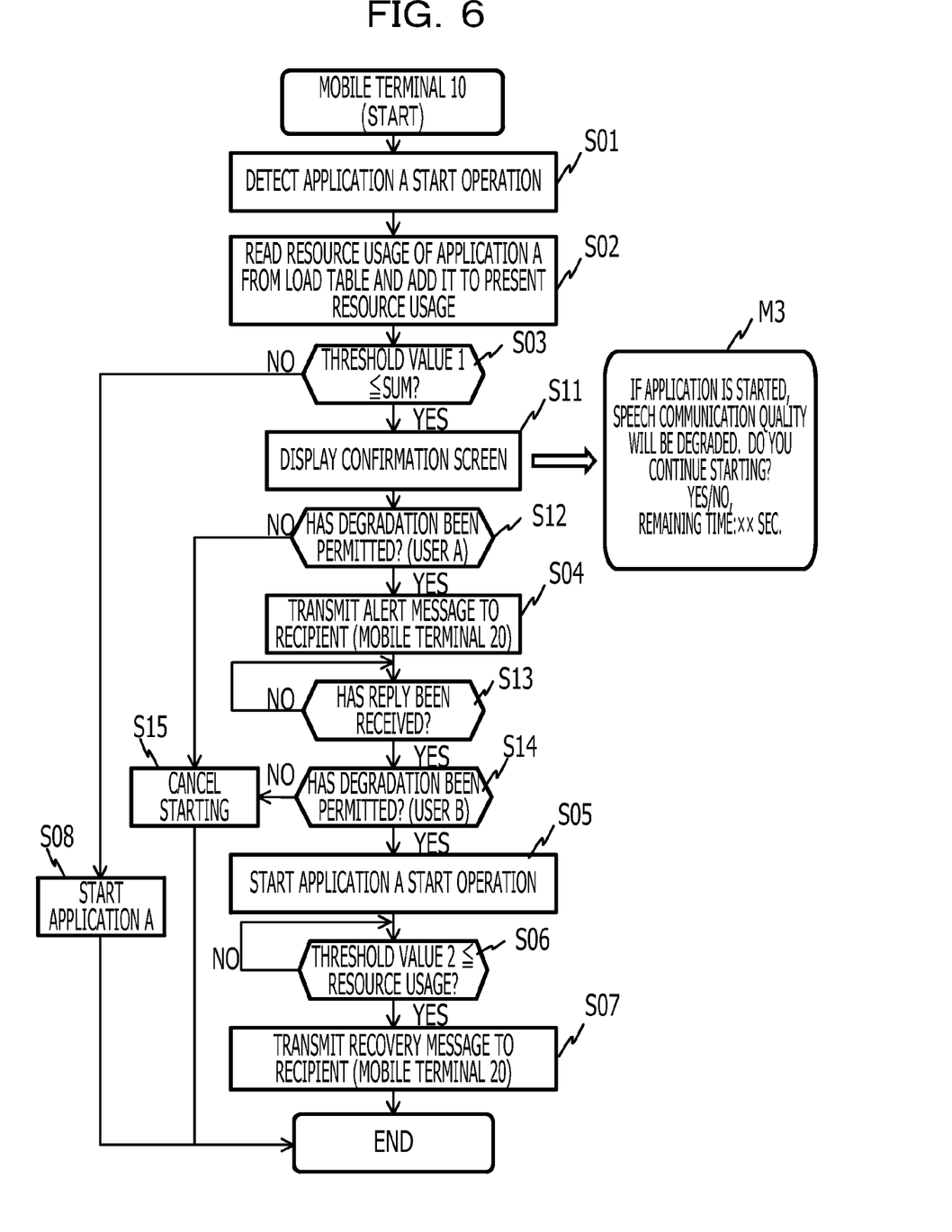
FIG. 6 is a flowchart illustrating an example of a process of a mobile terminal in service at a starting of an application.
Figure 7:
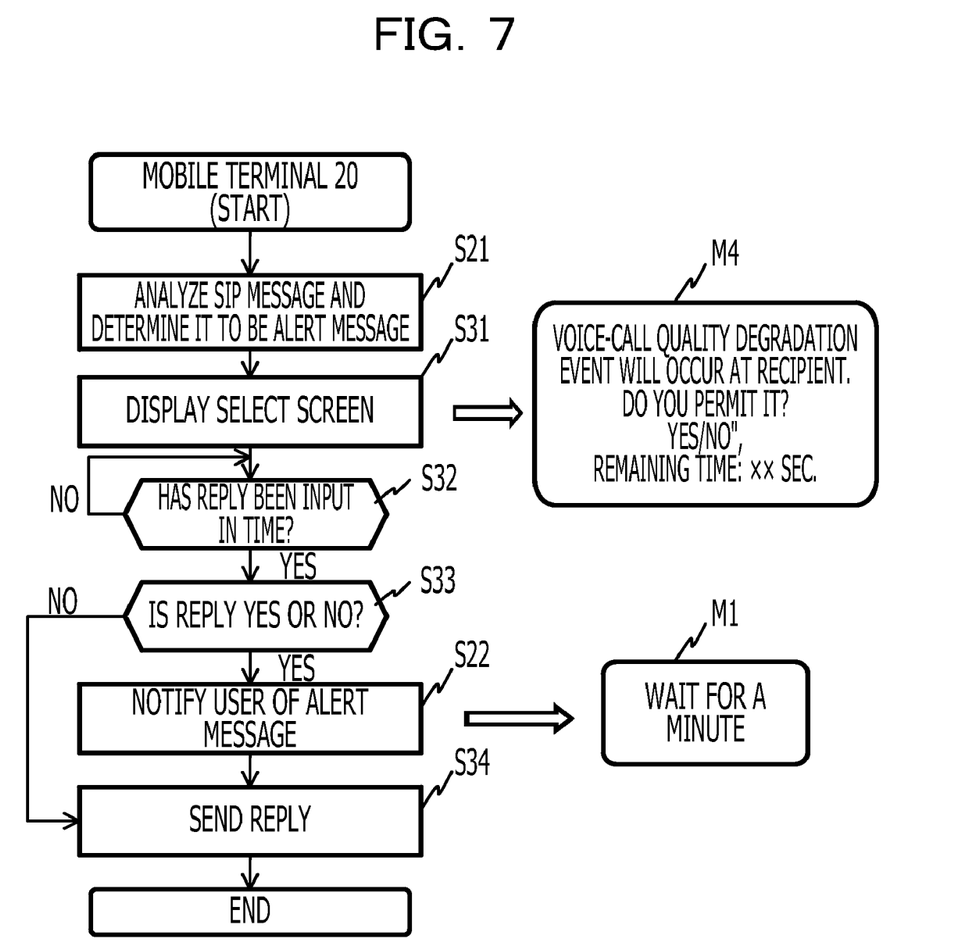
FIG. 7 is a flowchart illustrating an example of a process of a receiving-end mobile terminal after receiving an alert message.

Another operation example of the mobile terminal 10 is described in detail hereinbelow. Since this operation example includes points in common with the above-described operation, differences will be mainly described. FIG. 6 is a flowchart illustrating an example of a process of the mobile terminal 10 in service at the starting of an application. FIG. 7 is a flowchart illustrating an example of a process of the receiving-end mobile terminal 20 after receiving an alert message in the operation example.

Preconditions of an operation example of an embodiment, i.e., conditions for starting the process in FIG. 6, can be the same as those in the above-described operation. The process in FIG. 6 is started, for example, when the process of starting the application A is started in the mobile terminal 10 during a voice call between the mobile terminal 10 and the mobile terminal 20.

Description of the process from operation S01 to operation S03 in FIG. 6 is omitted because it is the same as that of the above-described operation (FIG. 3). In operation S03, if the sum of the present (current) resource usage and the resource usage of the application A is smaller than the threshold value 1 (S03: NO), the application A is started (operation S08 in FIG. 6), and the process shown in FIG. 6 ends. In other words, the user A of the mobile terminal 10 and the user B of the mobile terminal 20 can continue the conversation with a good (acceptable) speech communication quality irrespective of the starting of the application A.

In contrast, if the sum is greater than or equal to the threshold value 1 (S03: YES), the process of display a confirmation screen is performed (operation S11 in FIG. 6). In other words, the load control section 83 writes the present resource usage, i.e., the resource usage before the starting of the application A to the load table 86. The load control section 83 instructs the UI control section 84 to display a confirmation screen.

The UI control section 84 reads the data of the confirmation screen stored in advance in the storage area of the secondary storage unit 3 and controls the display of the output device 5 to display a confirmation screen M3 (FIG. 6) based on the confirmation screen data.

As shown in FIG. 6, the confirmation screen M3 may include a character message that asks the user (user A) whether to continue the starting after warning of degradation of speech communication quality, such as "If the application is started, the speech communication quality will be degraded. Do you continue the starting? YES/NO".

The user A of the mobile terminal 10 can input a reply (YES or NO) to the inquiry to the confirmation screen M3 through manipulation of the input device 4. The confirmation screen M3 can display time indicating the remaining of reply input time. The display of the remaining time prompts the user A to input a reply quickly.

The UI control section 84 waits for an input of the reply of the user A until the reply input time runs out. The reply from the user A is given to the UI control section 84 via the input device 1. The UI control section 84 determines whether the user A has permitted the degradation of speech communication quality by determining whether the reply is "YES" or "NO" (operation S12 in FIG. 6). In other words, at operation S12, determination is made as to whether the application should be started even when the degradation of speech communication quality is indicated.

If the reply is "NO" (S12: NO), the UI control section 84 determines that the user A has not permitted the degradation of speech communication quality and does not want to continue the process of starting the application A and thus instructs the application-startup control section 82 to cancel the starting of the application A. Then, the application-startup control section 82 cancels the starting of the application A (operation S15 in FIG. 6). Thereafter, the process in FIG. 6 is terminated. This prevents the application A from starting and allows the user A to continue the conversation with the user B without degradation of speech communication quality due to the starting of the application A.

If a reply from the user A is not input until the reply input time runs out, the UI control section 84 instructs the application-startup control section 82 to cancel the starting of the application A, as in the case where the reply is "NO", so that the application-startup control section 82 cancels the starting of the application A (operation S15 in FIG. 6).

In contrast, if the reply is "YES" (S12: YES), it is determined that the user A has permitted the degradation of speech communication quality, i.e., the user A wants the starting of the application A. In this case, the process of transmitting an alert message is performed (operation S04 in FIG. 6).

In other words, the UI control section 84 instructs the message control section 85 to transmit an alert message. The message control section 85 creates an alert message. In this case, the message control section 85 creates an alert message including a message type "Dialog-OPEN" as a conversation control message (FIG. 4A). For example, an SIP message including a conversation control message "Dialog-OPEN: user1 CPU Busy 20081217 16:12:32" is created and is transmitted to the mobile terminal 20.

The SIP message (alert message) is received by the mobile terminal 20 through the same communication path as in the above-described operation. FIG. 7 is a flowchart illustrating an example of the process of the receiving-end mobile terminal 20 after receiving the alert message in the operation example 2.

In FIG. 7, the SIP message is given to the message control section 85 of the mobile terminal 20 as in the above-described operation. The message control section 85 analyzes the received SIP message and determines that the SIP message is an alert message having the message type "Dialog-OPEN" (operation S21 in FIG. 7).

Then, the process of displaying a select screen is performed (operation S31 in FIG. 7). Specifically, the message control section 85 instructs the UI control section 84 to display a select screen (dialog box) based on the message type "Dialog-OPEN". The UI control section 84 reads the data of the select screen stored in the storage area of the secondary storage unit 3 and displays a select screen M4 (see FIG. 7) based on the data of the select screen on the display of the output device 5.

For example, the select screen M4 displays a character message that warns of the occurrence of a voice-call quality degradation event and inquires whether to permit the occurrence of a voice-call quality degradation event, such as "A voice-call quality degradation event will occur at the recipient. Do you permit it? YES/NO", as shown in FIG. 7.

The select screen M4 displays time indicating the remaining of reply input time. The display of the remaining time prompts the user A to input a reply quickly. The user B of the mobile terminal 20 can input a reply (YES or NO) to the inquiry to select screen M4 by manipulation of the input device 4.

The UI control section 84 waits for an input of the reply of the user B until the reply input time runs out (operation S32 in FIG. 7). The reply from the user B is given to the UI control section 84 via the input device 1. The UI control section 84 determines whether the user B has permitted the degradation of speech communication quality by determining whether the reply is "YES" or "NO" (operation S33 in FIG. 7).

If the reply is "NO" (S33: NO), the process moves to a reply sending process in operation S34. In operation S34, a reply message indicating that the user B has not permitted the degradation of speech communication quality and does not want to continue the process of starting the application A is created. In other words, the UI control section 84 instructs the message control section 85 to create a response message indicating that the reply is "NO". The message control section 85 creates the response message using the format of the SIP message including the conversation control message.

In this case, the message control section 85 creates an SIP message in which a conversation control message including a message type "Dialog-CLOSE" (see FIGS. 4A and 4B) is described in the extended area and transmits the SIP message to the mobile terminal 10.

Also when the user B has not input a reply within the reply input time, the UI control section 84 instructs the message control section 85 to create a response message indicating that the reply is "NO", so that the message control section 85 creates the SIP message in which the conversation control message including the message type "Dialog-CLOSE" (see FIGS. 4A and 4B) is described in the extended area and transmits the SIP message to the mobile terminal 10.

The SIP message in which the conversation control message including the message type "Dialog-CLOSE" is described in the extended area is transmitted to the mobile terminal 10.

In contrast, if the reply is "YES" (S33: YES), the UI control section 34 notifies the user B of the alert message (operation S22 in FIG. 7). Thus, the user B is notified of a warning of the degradation of speech communication quality using the same method as in the operation described above. For example, the screen M1 including the character message "Wait for a minute" that warns the user B to keep from conversation as the speech communication quality degrades, as shown in FIG. 7, is displayed on the display. Alternatively, in addition to the screen display, an audible alert (alarm) or an audible guidance is output from the speaker.

This allows the user B of the mobile terminal 20 to know from the character message displayed on the display or the alarm and/or audible guidance that the speech communication quality will be degraded and to keep from conversation for a while. Thereafter, the process moves to operation S34.

In operation S34, the UI control section 84 creates a response message indicating that the user B has permitted the degradation of speech communication quality. In other words, the UI control section 84 instructs the message control section 85 to create a response message indicating that the reply is "YES". The message control section 85 creates the response message using the format of the SIP message including the conversation control message.

In this case, the message control section 85 creates an SIP message in which a conversation control message including the message type "Dialog-OK" (see FIGS. 4A and 4B) is described in the extended area and transmits the SIP message to the mobile terminal 10. Thereafter, the process of the mobile terminal 20 shown in FIG. 7 ends.

After transmitting the alert message (operation S04 in FIG. 6), the mobile terminal 10 waits for a response message from the mobile terminal 20 for a predetermined time (operation S13 in FIG. 6). If the mobile terminal 10 has received a response message within the predetermined time, and if the predetermined time has passed without receiving a response message, the process moves to operation S14.

The SIP message serving as the response message received by the mobile terminal 10 is given to the message control section 85. In operation S14, the message control section 85 analyzes the SIP message to determine whether the message type described in the extended area of the SIP message is "Dialog-CLOSE" or "Dialog-OK".

At that time, if the message type is "Dialog-CLOSE", the message control section 85 determines that the user B (i.e., recipient) has not permitted the degradation of speech communication quality (S14: NO), and the process moves to operation S15. In operation S15, the starting of the application A is cancelled. Thereafter, the process of the mobile terminal 10 in FIG. 6 is terminated. Also when no response message has been received within a predetermined time, the same process as in the case where the response message including the message type "Dialog-CLOSE" has been received is performed.

In contrast, if the message type is "Dialog-OK", the message control section 85 determines that the user B (i.e., recipient) has permitted the degradation of speech communication quality (S14: YES), and the process moves to operation S05 in FIG. 6. Since the process from operations S05 to S07 in FIG. 6 is the same as that of the operation described above, a description thereof will be omitted. In operation S07, a recovery message is transmitted to the mobile terminal 20, so that the mobile terminal 20 performs the same process as in FIG. 5B.

In the operation example 2, if the resource usage of the mobile terminal 10 is greater than or equal to the threshold value 1, the confirmation screen M3 for starting the application A is displayed to ask the user A whether to permit starting the application A. If the user A has not permitted starting the application A, the starting of the application A is cancelled. In contrast, if the user A has permitted starting, an alert message is transmitted to the mobile terminal 20.

The mobile terminal 20 that has received the alert message displays a select screen M4 (dialog box) on the display to ask the user B whether to permit starting the application A. If the user B has inputted a reply that the starting is not permitted, a response message indicating that the starting is not permitted is transmitted to the mobile terminal 10. If the user B has inputted a reply that the starting is permitted, a response message indicating that the starting is permitted is transmitted to the mobile terminal 10.

If the response message indicates that the starting of the application A is not permitted, the mobile terminal 10 that has received the response message cancels the starting of the application A. In contrast, if the response message permits the starting of the application A, the process of starting the application A is started. Thereafter, at the point where the process of starting the application A ends, i.e. when the resource usage has become smaller than or equal to the threshold value 2, a recovery message is transmitted to the mobile terminal 20.

The user B of the mobile terminal 20 is notified of a recovery from the degradation of speech communication quality on the basis of the recovery message. Thus, in the operation example 2, in addition to the advantages of the operation described above, the application A can be started when both the user A and the user B permit degradation of speech communication quality. This prevents a shift to degradation of speech communication quality merely by the determination of the user A.

Any of the operation examples described above can be selectively executed. In other words, the mobile terminals 10 and 20 may execute only one of the operation examples described above. If an application starting process is performed by the mobile terminal 20 during conversation between the mobile terminal 10 and the mobile terminal 20, the mobile terminal 20 performs the operation of the mobile terminal 10 in the operation examples described above, and the mobile terminal 10 performs the operation of the mobile terminal 20 in the operation examples described above.

In an embodiment, operations S11 and S12 for displaying the confirmation screen M3 (FIG. 6) may be optional. In other words, operations S11 and S12 can be omitted. On the other hand, in the operation example 2, operations S31 to S33 for displaying the select screen may be optional. In other words, operations S31 to S33 can be omitted.

Figure 8:
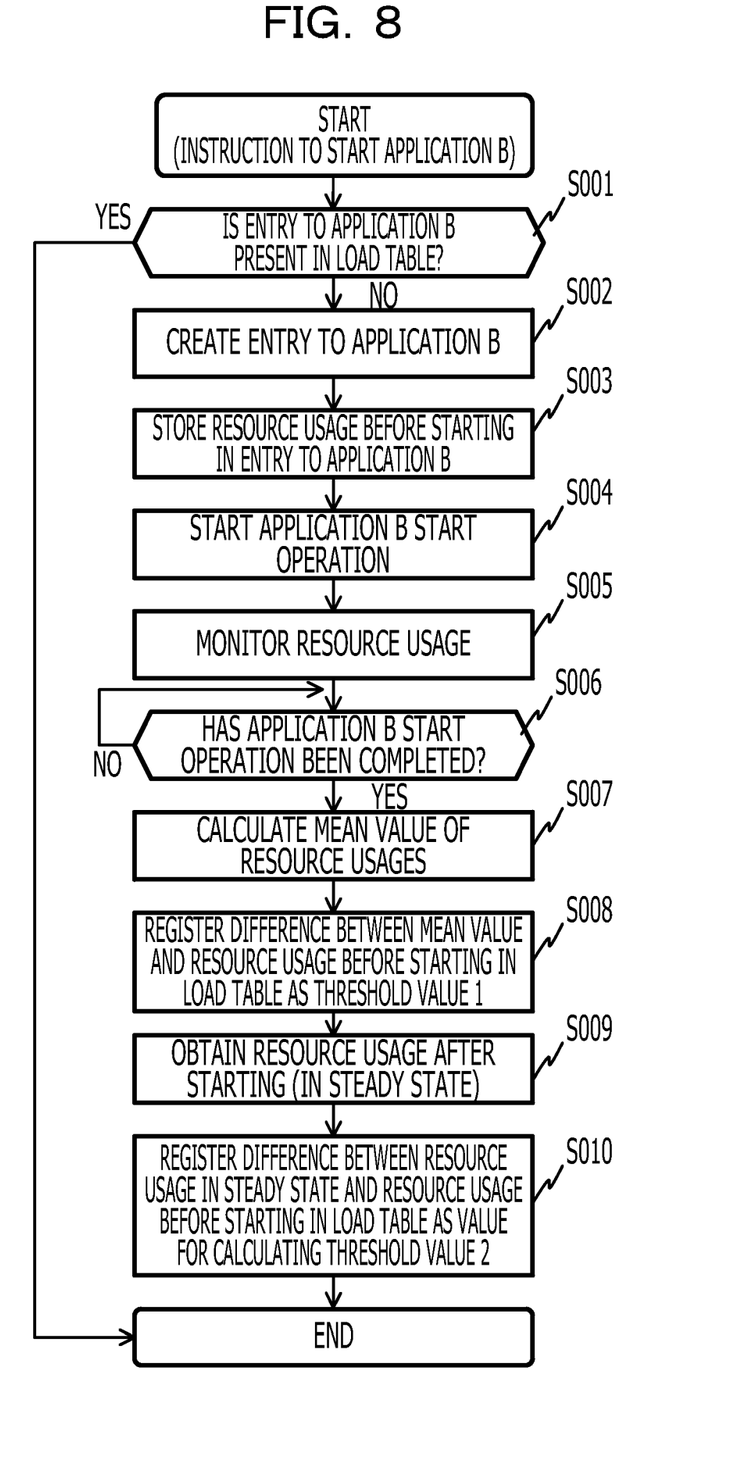
FIG. 8 is a flowchart illustrating an example of a process of storing information in a load table.

The above embodiments have been described for an example in which the loads (resource usages) of the individual applications are stored in the load table 86. FIG. 8 is a flowchart illustrating an example of the process of storing information in the load table 86.

The process shown in FIG. 8 is started when, for example, an instruction to start one application (in this example, an application B) is sent from the application monitoring section 81 to the application-startup control section 82.

The application-startup control section 82 that has received the instruction to start the application B determines whether an entry to the application B is stored in the load table 86 with reference to the load table 86 (operation S001).

If an entry to the application B is stored in the load table 86 (S001: YES), the process shown in FIG. 8 ends. In contrast, if an entry to the application B is not stored in the load table 86 (S001: NO), the application-startup control section 82 creates an entry to the application B in the load table 86 (operation S002) and notifies the load control section 83 of the starting of the application B.

The load control section 83 that has been notified of the starting of the application B obtains the present resource usage and stores the resource usage as a resource usage before the starting of the application B in the entry to the application B in the load table 86 (operation S003). The load control section 83 notifies the application B of the fact that the resource usage before the starting has been stored.

The application-startup control section 82 that has been notified of the storage of the resource usage before the starting starts the process of starting the application B (operation S004) and gives an instruction to start the application B to the load control section 83. On reception of the instruction to start the starting, the load control section 83 continuously monitors the resource usage (operation S005).

On completion of the process of starting the application B (operation S006: YES), the application-startup control section 82 gives a notification of completion of the starting of the application B to the load control section 83. On reception of the notification of completion of the starting, the load control section 83 calculates the mean value of the resource usages after receiving the notification of starting until receiving the notification of completion of the starting (operation S007).

Subsequently, the load control section 83 reads the resource usage before the starting from the entry to the application B in the load table 86 and calculates a difference from the mean value. The load control section 83 registers the calculated difference to the entry to the application B in the load table 86 as the resource usage of the application B, i.e., the threshold value 1 (operation S008).

The load control section 83 obtains the present resource usage, i.e., a resource usage with the application B in a steady stat (operation S009), and calculates a difference from the resource usage before the starting. The load control section 83 registers the difference between the resource usage in the steady state and the resource usage before the starting to the entry to the application B in the load table 83 as a value for calculating the threshold value 2 described in the operations described above (operation S010).

Thereafter, if an operation for starting the application B is performed during a call, the process in operation S03 (FIGS. 3 and 6) is executed using the threshold value 1 stored in the load table 86, and the threshold value 2 for executing the process in operation S06 (FIGS. 3 and 6) is calculated using the value for calculating the threshold value 2.

In the process shown in FIG. 8, the resource usage before the starting may be temporarily stored until the threshold value 1 is registered. Instead of the mean value, the highest resource usage during a starting operation may be adopted. The entry may be created by the load control section 83 instead of the application-startup control section 82.

According to the above embodiments, in the case where, during a call between the mobile terminal 10 and the mobile terminal 20, the user A or B wants to call up information necessary for the conversation, stored in the mobile terminal 10 or the mobile terminal 20, and to use the information for the conversation, an alert message is transmitted to the recipient so as to warn of the degradation of speech communication quality, thereby prompting the user A or B to interrupt the conversation. Since a recover message is transmitted at a recovery from the degradation of speech communication quality, the user A or B can be prompted to restart the conversation. This allows the user to have a conversation without stress while using information stored in the mobile terminal.

Although the above embodiments have been described as applied to a call using a mobile phone function, the operations described above can be performed also when an instruction to start an application is issued during a call using an IP phone function. The configurations and functions of the mobile terminals 10 and 20 shown in the embodiments can also be applied to fixed terminal devices but are preferably applied to mobile terminals.

According to an embodiment, a method of operating a terminal device is provided including adjusting a resource usage data responsive to an instruction to startup an application of the terminal received while a voice call processing, and providing a notification to a participant of the voice call processing when said adjusting indicates the resource usage exceeds a threshold value set for the terminal device.

The above embodiments have been described as applied to an example in which various messages with the starting of an application are transmitted and received via the IP network N2 during a call using the mobile phone network N1. As another embodiment, a configuration in which calls and IP communications for transmitting and receiving messages are performed using only the mobile phone network N1 can be adopted. In other words, IP communications using the mobile phone network N1 to transmission and reception of various messages, such as an alert message and a recovery message, can be applied. As another embodiment, a configuration in which voice communications using IP phones and IP communications for transmission and reception of messages are performed using only the IP network N2 can be adopted. In other words, voice communications may be performed via either the mobile telephone network N1 or the IP network N2 using IP phones. The transmission and reception of messages may be either IP communications via the mobile phone network N1 or IP communications via the IP network N2. Networks for voice communications and the transmission and reception of messages can be determined as appropriate.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention, the scope of which is defined in the claims and their equivalents.

What is claimed is:

1. A terminal device, comprising:
a call control unit configured to process a phone call with a recipient;
an application control unit configured to control execution of an application program;
a determination unit configured, when the application control unit issues an instruction to start the application program during a call processing by the call control unit, to determine whether a speech communication quality will be degraded;
a transmitting unit configured, when determining that the speech communication quality will be degraded, to transmit an alert message for warning of the degradation of speech communication quality to the recipient;
an inquiry unit configured, when determining that the speech communication quality will be degraded, to prompt a user to input a reply whether to permit the degradation of speech communication quality, and
wherein when the reply input from the user indicates permission of the degradation of speech communication quality, the transmitting unit transmits the alert message to the recipient, and when the reply indicates that the degradation of speech communication quality is not permitted, the application control unit cancels a starting of the application.

2. The terminal device according to claim 1, comprising:
a receiving unit configured to receive a response message to the alert message, and
wherein when the response message indicates that the recipient has permitted the degradation of speech communication quality, the application control unit executes a process of starting the application program, and when the response message indicates that the recipient has not permitted the degradation of speech communication quality, the application control unit cancels the process of starting of the application program.

3. The terminal device according to claim 1, wherein when a load on the terminal device is greater than a threshold value, the determination unit determines that the speech communication quality will be degraded.

4. The terminal device according to claim 1, comprising:
a receiving unit configured to receive the alert message from the recipient; and
a notifying unit configured, when the alert message is received, to indicate the degradation of speech communication quality based on the alert message.

5. The terminal device according to claim 1, comprising:
a receiving unit configured to receive the recovery message from the recipient; and
a notifying unit configured, when a recovery message is received, to indicate a recovery from the degradation of speech communication quality.

6. The terminal device according to claim 1, wherein the transmitting unit transmits a recovery message for indicating a recovery from the degradation of speech communication quality according to a status of the application program to the recipient.

7. The terminal device according to claim 6, wherein when a load on the terminal device becomes a state indicating a completion of the application program, the transmitting section transmits the recovery message.

8. A terminal device, comprising:
a call control unit configured to process a phone call with a recipient;
a receiving unit configured, during a call processing by the call control unit, to receive an alert message for warning of a degradation of a speech communication quality from the recipient;
a notifying unit configured to indicate the degradation of speech communication quality based on the alert message;
an inquiry unit configured to prompt a user to input a reply whether to permit the degradation of speech communication quality when receiving the alert message;
a transmitting unit configured to transmit a response message indicating the reply input from the user to the recipient, and
wherein when the reply input from the user indicates permission of the degradation of speech communication quality, the transmitting unit transmits the alert message to the recipient, and when the reply indicates that the degradation of speech communication quality is not permitted, the application control unit cancels a starting of the application.

9. The terminal device according to claim 8, wherein
the receiving unit receives a recovery message for indicating the recovery from the degradation of speech communication quality from the recipient; and the notifying unit performs a notifying process for indicating a recover from the degradation of speech communication quality based on the recovery message.

10. A method of operating a terminal device, comprising:
adjusting a resource usage data responsive to an instruction to startup an application of the terminal device received while a voice call processing;
providing a notification to a participant of the voice call processing when said adjusting indicates the resource usage exceeds a threshold value set for the terminal device;
prompting a user to input a reply whether to permit degradation of speech communication quality when determining that the speech communication quality will be degraded, and
wherein when a reply from the user indicates permission of the degradation of speech communication quality, an alert message is transmitted to a recipient, and when the reply indicates that the degradation of speech communication quality is not permitted, a starting of the application is cancelled.

* * * * *